(12) United States Patent
Gunawan

(10) Patent No.: US 8,665,227 B2
(45) Date of Patent: Mar. 4, 2014

(54) METHOD AND APPARATUS FOR REPLICATING PHYSICAL KEY FUNCTION WITH SOFT KEYS IN AN ELECTRONIC DEVICE

(75) Inventor: Suwinto Gunawan, Libertyville, IL (US)

(73) Assignee: Motorola Mobility LLC, Libertyville, IL (US)

( * ) Notice: Subject to any disclaimer, the term of this patent is extended or adjusted under 35 U.S.C. 154(b) by 762 days.

(21) Appl. No.: 12/622,418

(22) Filed: Nov. 19, 2009

(65) Prior Publication Data

US 2011/0115711 A1    May 19, 2011

(51) Int. Cl.
*G06F 3/041*    (2006.01)

(52) U.S. Cl.
USPC .......................................... 345/173; 345/169

(58) Field of Classification Search
None
See application file for complete search history.

(56) References Cited

U.S. PATENT DOCUMENTS

| | | | |
|---|---|---|---|
| 4,286,289 A | 8/1981 | Ottesen et al. | |
| 4,806,709 A | 2/1989 | Evans | |
| 4,914,624 A * | 4/1990 | Dunthorn ...................... | 345/173 |
| 4,967,083 A | 10/1990 | Kornbrekke et al. | |
| 5,179,369 A | 1/1993 | Person et al. | |
| 5,414,413 A | 5/1995 | Tamaru et al. | |
| 5,500,935 A | 3/1996 | Moran et al. | |
| 5,565,894 A | 10/1996 | Bates et al. | |
| 5,684,294 A | 11/1997 | Kouhi | |
| 5,781,662 A | 7/1998 | Mori et al. | |
| 5,821,521 A | 10/1998 | Bridgelall et al. | |
| 5,880,411 A | 3/1999 | Gillespie et al. | |
| 5,945,988 A | 8/1999 | Williams et al. | |
| 6,002,427 A | 12/1999 | Kipust | |
| 6,107,994 A | 8/2000 | Harada et al. | |
| 6,184,538 B1 | 2/2001 | Bandara et al. | |
| 6,215,116 B1 | 4/2001 | Van Marcke | |
| 6,219,032 B1 * | 4/2001 | Rosenberg et al. ........... | 345/157 |
| 6,246,407 B1 | 6/2001 | Wilks et al. | |
| 6,246,862 B1 | 6/2001 | Grivas et al. | |
| 6,292,674 B1 | 9/2001 | Davis | |
| 6,330,457 B1 | 12/2001 | Yoon | |
| 6,438,752 B1 | 8/2002 | McClard | |

(Continued)

FOREIGN PATENT DOCUMENTS

| | | |
|---|---|---|
| EP | 1278116 | 1/2003 |
| EP | 1445922 | 8/2004 |

(Continued)

OTHER PUBLICATIONS

Metzger, C et al., "FreeDigiter: A Contact-Free Device for Gesture Control" Eight International Symposium on Wearable Computers, *ISWC 2004*, Oct. 31-Nov. 3, 2004, 4 pages.

(Continued)

*Primary Examiner* — Dismery Mercedes

(57) ABSTRACT

An electronic device (100) is provided with a touch-sensitive display (109). The electronic device (100) includes one or more physical keys (105,106,107,108), each of which has a corresponding function. When a user (110) touches the touch-sensitive display (109) for a predetermined amount of time, one or more processors (203) present one or more soft keys as user actuation targets (101,102,103,104) on the touch-sensitive display (109). The user actuation targets (101,102,103, 104) can replicate the functions of the physical keys (105, 106,107,108), thereby affording the user (110) the ability to execute those functions with soft keys, rather than by having to access the physical keys (105,106,107,108).

20 Claims, 7 Drawing Sheets

(56) References Cited

U.S. PATENT DOCUMENTS

| | | | |
|---|---|---|---|
| 6,460,183 B1 | 10/2002 | Van Der Vleuten | |
| 6,525,854 B1 | 2/2003 | Takahashi et al. | |
| 6,721,954 B1 | 4/2004 | Nickum | |
| 6,816,154 B2 | 11/2004 | Wong et al. | |
| 6,933,922 B2 | 8/2005 | Casebolt et al. | |
| 6,941,161 B1 | 9/2005 | Bobisuthi et al. | |
| 7,046,230 B2 | 5/2006 | Zadesky et al. | |
| 7,103,852 B2 | 9/2006 | Kairis | |
| 7,134,092 B2 | 11/2006 | Fung et al. | |
| 7,166,966 B2 | 1/2007 | Naugler et al. | |
| 7,212,835 B2 | 5/2007 | Mantyjarvi et al. | |
| 7,340,077 B2 | 3/2008 | Gokturk et al. | |
| 7,380,716 B2 | 6/2008 | Yokoyama | |
| 7,468,689 B2 | 12/2008 | Ma et al. | |
| 7,479,949 B2 | 1/2009 | Jobs et al. | |
| 7,486,386 B1 | 2/2009 | Holcombe et al. | |
| 7,489,297 B2 | 2/2009 | Hohmann et al. | |
| 7,509,588 B2 | 3/2009 | Van Os et al. | |
| 7,519,918 B2 | 4/2009 | Tantrow | |
| 7,532,196 B2 | 5/2009 | Hinckley | |
| 7,534,988 B2 | 5/2009 | Kong et al. | |
| 7,557,965 B2 | 7/2009 | Taylor et al. | |
| 7,561,146 B1 | 7/2009 | Hotelling | |
| 7,630,716 B2 | 12/2009 | Tamura et al. | |
| 7,687,774 B2 | 3/2010 | Ohta et al. | |
| 7,715,723 B2 | 5/2010 | Kagawa et al. | |
| 7,721,310 B2 | 5/2010 | Schaffer et al. | |
| 7,728,958 B2 | 6/2010 | Pfaff | |
| 7,795,584 B2 | 9/2010 | Mok et al. | |
| 7,855,716 B2 | 12/2010 | McCreary et al. | |
| 7,912,376 B2 | 3/2011 | Rollins | |
| 7,971,156 B2 | 6/2011 | Albertson et al. | |
| 7,991,896 B2 | 8/2011 | Shen et al. | |
| 7,995,041 B2 | 8/2011 | Chang | |
| 8,006,002 B2 | 8/2011 | Kalayjian et al. | |
| 8,018,501 B2 | 9/2011 | Sasaki | |
| 8,023,061 B2 | 9/2011 | Ra | |
| 8,072,469 B2 | 12/2011 | Ottney | |
| 8,104,113 B2 | 1/2012 | Rodenbeck et al. | |
| 2001/0019338 A1 | 9/2001 | Roth | |
| 2002/0104081 A1 | 8/2002 | Candelore et al. | |
| 2002/0122072 A1 | 9/2002 | Selker | |
| 2002/0199186 A1 | 12/2002 | Ali et al. | |
| 2003/0011638 A1* | 1/2003 | Chung | 345/808 |
| 2003/0063128 A1 | 4/2003 | Salmimaa et al. | |
| 2003/0080947 A1* | 5/2003 | Genest et al. | 345/173 |
| 2003/0222917 A1 | 12/2003 | Tantrow | |
| 2004/0203674 A1* | 10/2004 | Shi et al. | 455/415 |
| 2005/0028453 A1 | 2/2005 | Smith | |
| 2005/0104860 A1 | 5/2005 | McCreary et al. | |
| 2005/0150697 A1 | 7/2005 | Altman et al. | |
| 2005/0232447 A1 | 10/2005 | Shinozuka et al. | |
| 2005/0289182 A1 | 12/2005 | Pandian et al. | |
| 2006/0010400 A1 | 1/2006 | Dehlin et al. | |
| 2006/0028453 A1 | 2/2006 | Kawabe | |
| 2006/0031786 A1 | 2/2006 | Hillis et al. | |
| 2006/0059152 A1 | 3/2006 | Nakamura | |
| 2006/0125799 A1 | 6/2006 | Hillis et al. | |
| 2006/0132456 A1 | 6/2006 | Anson | |
| 2006/0161870 A1 | 7/2006 | Hotelling et al. | |
| 2006/0161871 A1* | 7/2006 | Hotelling et al. | 715/863 |
| 2006/0197753 A1* | 9/2006 | Hotelling | 345/173 |
| 2006/0256074 A1 | 11/2006 | Krum et al. | |
| 2007/0008300 A1 | 1/2007 | Yang et al. | |
| 2007/0035524 A1* | 2/2007 | Hyatt | 345/173 |
| 2007/0109266 A1 | 5/2007 | Davis et al. | |
| 2007/0137462 A1 | 6/2007 | Barros et al. | |
| 2007/0152975 A1* | 7/2007 | Ogihara et al. | 345/173 |
| 2007/0152978 A1* | 7/2007 | Kocienda et al. | 345/173 |
| 2007/0177803 A1 | 8/2007 | Elias et al. | |
| 2007/0180392 A1 | 8/2007 | Russo | |
| 2007/0220437 A1 | 9/2007 | Boillot | |
| 2007/0242054 A1 | 10/2007 | Chang et al. | |
| 2007/0247643 A1 | 10/2007 | Nakamura | |
| 2008/0005703 A1 | 1/2008 | Radivojevic et al. | |
| 2008/0006272 A1 | 1/2008 | Lewis | |
| 2008/0024454 A1 | 1/2008 | Everest | |
| 2008/0024459 A1* | 1/2008 | Poupyrev et al. | 345/173 |
| 2008/0052643 A1 | 2/2008 | Ike et al. | |
| 2008/0079902 A1 | 4/2008 | Mandelstam-Manor et al. | |
| 2008/0122803 A1 | 5/2008 | Izadi et al. | |
| 2008/0129688 A1 | 6/2008 | Richardson et al. | |
| 2008/0136784 A1* | 6/2008 | Neoh et al. | 345/173 |
| 2008/0161870 A1 | 7/2008 | Gunderson | |
| 2008/0165140 A1 | 7/2008 | Christie et al. | |
| 2008/0192005 A1 | 8/2008 | Elgoyhen et al. | |
| 2008/0195735 A1 | 8/2008 | Hodges et al. | |
| 2008/0204427 A1 | 8/2008 | Heesemans et al. | |
| 2008/0211771 A1 | 9/2008 | Richardson | |
| 2008/0219672 A1 | 9/2008 | Tam et al. | |
| 2008/0225041 A1 | 9/2008 | El Dokor et al. | |
| 2008/0240568 A1 | 10/2008 | Tonouchi | |
| 2008/0252595 A1 | 10/2008 | Boillot | |
| 2008/0256494 A1 | 10/2008 | Greenfield | |
| 2008/0266083 A1 | 10/2008 | Midholt et al. | |
| 2008/0280642 A1 | 11/2008 | Coxhill et al. | |
| 2008/0284738 A1 | 11/2008 | Hovden et al. | |
| 2008/0297487 A1 | 12/2008 | Hotelling et al. | |
| 2008/0303681 A1 | 12/2008 | Herz et al. | |
| 2008/0303799 A1* | 12/2008 | Schwesig et al. | 345/173 |
| 2008/0309641 A1 | 12/2008 | Harel et al. | |
| 2009/0021488 A1 | 1/2009 | Kali et al. | |
| 2009/0031258 A1 | 1/2009 | Arrasvuori et al. | |
| 2009/0061823 A1 | 3/2009 | Chu | |
| 2009/0092284 A1 | 4/2009 | Breed et al. | |
| 2009/0158203 A1 | 6/2009 | Kerr et al. | |
| 2009/0160793 A1 | 6/2009 | Rekimoto | |
| 2009/0219252 A1* | 9/2009 | Jarventie et al. | 345/173 |
| 2009/0253463 A1 | 10/2009 | Shin et al. | |
| 2009/0277697 A1 | 11/2009 | Bolt et al. | |
| 2009/0299633 A1 | 12/2009 | Hawes et al. | |
| 2009/0303176 A1 | 12/2009 | Chen et al. | |
| 2010/0077354 A1 | 3/2010 | Russo | |
| 2010/0079794 A1* | 4/2010 | Kim | 358/1.15 |
| 2010/0083108 A1* | 4/2010 | Rider et al. | 715/702 |
| 2010/0164479 A1 | 7/2010 | Alameh et al. | |
| 2010/0167783 A1 | 7/2010 | Alameh et al. | |
| 2010/0182264 A1* | 7/2010 | Hahn et al. | 345/173 |
| 2010/0271331 A1* | 10/2010 | Alameh et al. | 345/175 |
| 2011/0009194 A1 | 1/2011 | Gabai et al. | |
| 2011/0057885 A1* | 3/2011 | Lehtovirta | 345/173 |
| 2011/0115711 A1 | 5/2011 | Gunawan | |
| 2012/0046906 A1 | 2/2012 | Alameh et al. | |

FOREIGN PATENT DOCUMENTS

| | | |
|---|---|---|
| EP | 1657819 A2 | 10/2005 |
| EP | 1760573 | 3/2007 |
| EP | 2000896 | 12/2008 |
| EP | 2037349 | 3/2009 |
| EP | 2075683 | 7/2009 |
| EP | 2109295 | 10/2009 |
| JP | 02280427 | 11/1990 |
| JP | 2005-293419 | 10/2005 |
| JP | 2006-010489 | 1/2006 |
| JP | 2007-042020 | 2/2007 |
| JP | 2009-085799 | 4/2009 |
| KR | 10-2003-0044749 | 6/2003 |
| KR | 10-2005-0100642 | 10/2005 |
| WO | WO-9528777 | 10/1995 |
| WO | WO-02/41129 | 5/2002 |
| WO | WO-03023701 | 3/2003 |
| WO | WO-03076870 | 9/2003 |
| WO | WO-2005076542 | 8/2005 |
| WO | WO-2005/101176 | 10/2005 |
| WO | WO-2008016394 | 2/2008 |
| WO | WO-2008073289 | 6/2008 |

OTHER PUBLICATIONS

Consortium, "Specification of the Bluetooth System; Master Table of Contents & Compliance Requirements", *Covered Core Package V. 3.0+HS*; Apr. 21, 2009; 192 pages.

(56) References Cited

OTHER PUBLICATIONS

Silicon Laboratories, Inc., "Si1120 Evaluation Kit Users Guide", Austin TX, Dec. 2009, 10 pages. www.silabs.com/support/pages/contacttechincalsupport.aspx.

Ward, A et al., "A New Location Technique for the Active Office", *IEEE Personal Communications*, vol. 4, Issue 5; Oct. 1997, 11 pages.

Kahn, J.M. et al., "Imaging Diversity Receivers for High-Speed Infrared Wireless Communication", *IEEE Communications Magazine*, vol. 36, Issue 12, Dec. 1998, pp. 88-94.

Yun, G. et al., "Spot-Diffusing and Fly-Eye Receivers for Indoor Infrared Wireless Communications", *1992 IEEE International Conference on Selected Topics in Wireless Communications*, Jun. 25-26, 1992, pp. 262-265.

Bricklin, Dan "Gestures, the iPhone, and Standards: A Developer's Questions", *Internet Discussion @* www.bricklin.com/gestures.htm; Oct. 24, 2007, 10 pages.

Wikipedia, "Hadamard Transform", *Wikipedia definition*; http://en.wikipedia.org/wiki/Hadamard_transform; Downloaded Jan. 12, 2010, 4 pages.

Von Hardenberg, C. et al., "Bare-Hand Human-Computer Interaction", *Proceedings of the ACM Workshop on Perceptive User Interfaces*, Orlando, FL, USA, Nov. 15-16, 2001, 8 pages.

TrackIR, "How TracklR Works", *Internet Document @* www.naturalpoint.com/trackir/02-products/product-how-TrackIR-works.html; downloaded Jan. 13, 2010, 2 pages.

Motorola, Inc., "Mobile device with user interaction capability and method of operating same", U.S. Appl. No. 12/641,830, filed Dec. 18, 2009.

Motorola, Inc., "Menu Configuration System and Method for Display on an Electronic Device", U.S. Appl. No. 12/428,187, filed Apr. 22, 2009.

Motorola, Inc., "Devices and Methods for Adjusting Proximity Detectors", U.S. Appl. No. 12/500,625, filed Jul. 10, 2009.

Motorola, Inc., "Method and system for controlling data transmission to or from a mobile device", U.S. Appl. No. 12/646,199, filed Dec. 23, 2009.

Motorola, Inc., "Electronic device with sensing assembly and method for detecting gestures of geometric shapes", U.S. Appl. No. 12/646,601, filed Dec. 23, 2009.

Motorola, Inc., "Electronic device with sensing assembly and method for interpreting consecutive gestures", U.S. Appl. No. 12/643,211, filed Dec. 21, 2009.

Motorola, Inc., "Electronic device with sensing assembly and method for detecting basic gestures", U.S. Appl. No. 12/640,867, filed Dec. 17, 2009.

Motorola, Inc., "Method and system for conducting communication between mobile devices", U.S. Appl. No. 12/645,244, filed Dec. 22, 2009.

Motorola, Inc., "Electronic device with sensing assembly and method for interpreting offset gestures", U.S. Appl. No. 12/648,503, filed Dec. 29, 2009.

WIPO, "PCT Search Report and Written Opinion of the International Searching Authority", International Application No. PCT/US2009/06655 Jul. 16, 2010, 11 pages.

Gearlog, "Microsofts's SideSight: Something Apple Should Watch", Internet.Article @ www.gearlog.com/2008/10/_microsofts_sidesight_something.php; Oct. 20, 2008, 4 pages.

Motorola, Inc., "Touch-Screen and Method for an Electronic Device", U.S. Appl. No. 12/428,266, filed Apr. 22, 2009.

Costa, Marta "PCT Search Report and Opinion", mailed: Nov. 10, 2010 PCT/US2010/030964 Filed: Apr. 14, 2010.

WIPO, "PCT Search Report and Written Opinion of the International Searching Authority", International Application No. PCT/US2010/030964, filed Apr. 14, 2010.

Reitsma-Papageorgiou, Chrysanthi "PCT Search Report and Opinion", Mail: Sep. 30, 2010 Application: PCT/US2010/039561 Filed: Jun. 23, 2010.

Barba, Michelangelo "PCT Search Report and Opinion", Mailed: Dec. 1, 2010 Filing date: Mar. 25, 2010 Application: PCT/US2010/028654 Applicant: Motorola.

Nguyen, Tung X., "Notice of Allowance", First Inventor: Rachid M. Alameh U.S. Appl. No. 12/344,760 filed Dec. 29, 2008 Mailed: Jan. 3, 2011.

Lee, Jung H., "PCT Search Report and Opinion", International filing date: May 4, 2010 Internation application: PCT/US2010/033472 Mailing date: Dec. 15, 2010 Priority date: May 22, 2009.

James, Stephanie "PCT Search Report and Opinion", Mail date: Feb. 14, 2011 Filing date: Oct. 26, 2010 Application: PCT/US2010/054007 Priority Date: Nov. 19, 2009.

Rojas, Daniel E., "Non-Final Office Action", U.S. Appl. No. 12.347,146, filed Dec. 31, 2008, Mailed Jul. 18, 2011.

Wong, Kin C., "NonFinal Office Action", U.S. Appl. No. 12/428,187, filed Apr. 22, 2009; Mailed Oct. 26, 2011.

James, Stephanie "PCT Search Report", International Application No. PCT/US2011/054007; Filed Oct. 26, 2010; Mailed Feb. 14, 2011.

U.S. Appl. No. 12/471,062, filed May 22, 2009, Alameh, Rachid.

U.S. Appl. No. 12/428,187, filed Apr. 22, 2009, Alameh, Rachid.

U.S. Appl. No. 12/428,266, filed Apr. 22, 2009, Alameh, Rachid.

Fournier, Nicolas "PCT Search Report and Opinion", Application No. PCT/US2010/061261; Filed Dec. 20, 2010; Mailed Mar. 17, 2011.

Kim-Mayser, Michael "PCT Search Report and Opinion", Application No. PCT/US2010/061254; Filed Dec. 20, 2010; Mailed Apr. 7, 2011.

Kim, Kiho "Non-Final Office Action", U.S. Appl. No. 12/471,062; Inventor Rachid Alameh, filed May 22, 2009; Mailed Apr. 25, 2011.

Mercedes, Dismery E., "Non-Final Office Action," U.S. Appl. No. 12/428,266, filed Apr. 22, 2009; Mailed 5OC2011.

Merceds, Dismery E., "Final Office Action", U.S. Appl. No. 12/428,266, filed Apr. 22, 2009; Mailed Mar. 14, 2012.

Wong, Kin C., "Final Office Action", U.S. Appl. No. 12/428,187, filed Apr. 22, 2009; Mailed Apr. 10, 2012.

Pavlov, et al., "Publication", "*Model-based object characterization with active infrared sensor array*"; Published 2007; pp. 360-363.

Christensen, "Publication", "*Retrieval of 3D-Position of a Passive Object Using Infrared LED's and Photodiodes*"; IEEE published 2005; p. IV-1093-IV-1096.

"Non-Final Rejection", U.S. Appl. No. 12/500,625; Mailed Dec. 29, 2011.

"Non-Final Rejection", U.S. Appl. No. 12/646,199; Mailed Mar. 7, 2012.

"Non-Final Rejection", U.S. Appl. No. 12/471,062; Mailed Oct. 4, 2011.

"Final Rejection", U.S. Appl. No. 12/471,062; Mailed Feb. 22, 2012.

"Non-Final Rejection", U.S. Appl. No. 12/646,601; Mailed Feb. 14, 2012.

"Non-Final Rejection", U.S. Appl. No. 12/471,062; Mailed Sep. 30, 2011.

"Final Rejection", U.S. Appl. No. 12/471,062; Mailed Mar. 30, 2012.

"Non-Final Rejection", U.S. Appl. No. 12/648,503; Mailed Feb. 17, 2012.

Kim, et al., "Publication", "The gesture watch; a wireless contact-free gesture based wrist interface"; Published 2007; *11th IEEE International Symposium on Wearable Computers*, pp. 15-22.

Starner, et al., "Publication", "The gesture pendant: A self0illuminating, wearable, infrared computer vision system for home automation control and medical monitoring"; 2000, *IEEE 4th Internation Symposium on Wearable Computers*, pp. 87-94.

Ruser, H. "Object recognition with a smart low-cost active infrared sensor array"; Nov. 23-23, 2005, *1st International Conference on Sensing Technology*, pp. 494-499.

Rijas, Daniel E., "Notice of Allowance", U.S. Appl. No. 13/283,984, filed Oct. 28, 2011; Mailed Mar. 21, 2012.

Sedighian, Reza "NonFinal OA", U.S. Appl. No. 12/645,244, filed Dec. 22, 2009; Mailed May 24, 2012.

Wong, Kin C., "Non Final Office Actions", U.S. Appl. No. 12/428,187, filed Apr. 22, 2009; Mailed Sep. 24, 2012.

\* cited by examiner

METHOD AND APPARATUS FOR REPLICATING PHYSICAL KEY FUNCTION WITH SOFT KEYS IN AN ELECTRONIC DEVICE

BACKGROUND

1. Technical Field

This invention relates generally to user interfaces in electronic devices, and more particularly to a system and method for presenting soft keys having functions replicating physical keys in response to user input in an electronic device.

2. Background Art

Portable electronic devices, including mobile telephones, music and multimedia players, gaming devices, personal digital assistants, and the like are becoming increasingly commonplace. People use these devices to stay connected with others, to organize their lives, and to entertain themselves. Advances in technology have made these devices easier to use. For example, while in the recent past these devices had a display solely for presenting information and a keypad solely for receiving input from a user, the advent of "touch-sensitive screens" has resulted in displays that can both deliver and receive information. For example, rather than typing only on a keypad, touch-sensitive screens allow the user to enter data by touching the display. Touch-sensitive displays, in addition to being dynamically configurable, allow for more streamlined devices that are sometimes preferred by consumers.

One problem with prior art electronic devices having touch sensitive user interfaces is that they are sometimes cumbersome to use. There is thus a need for an improved touch sensitive user interface that is more efficiently controlled by a user.

Figure 1:
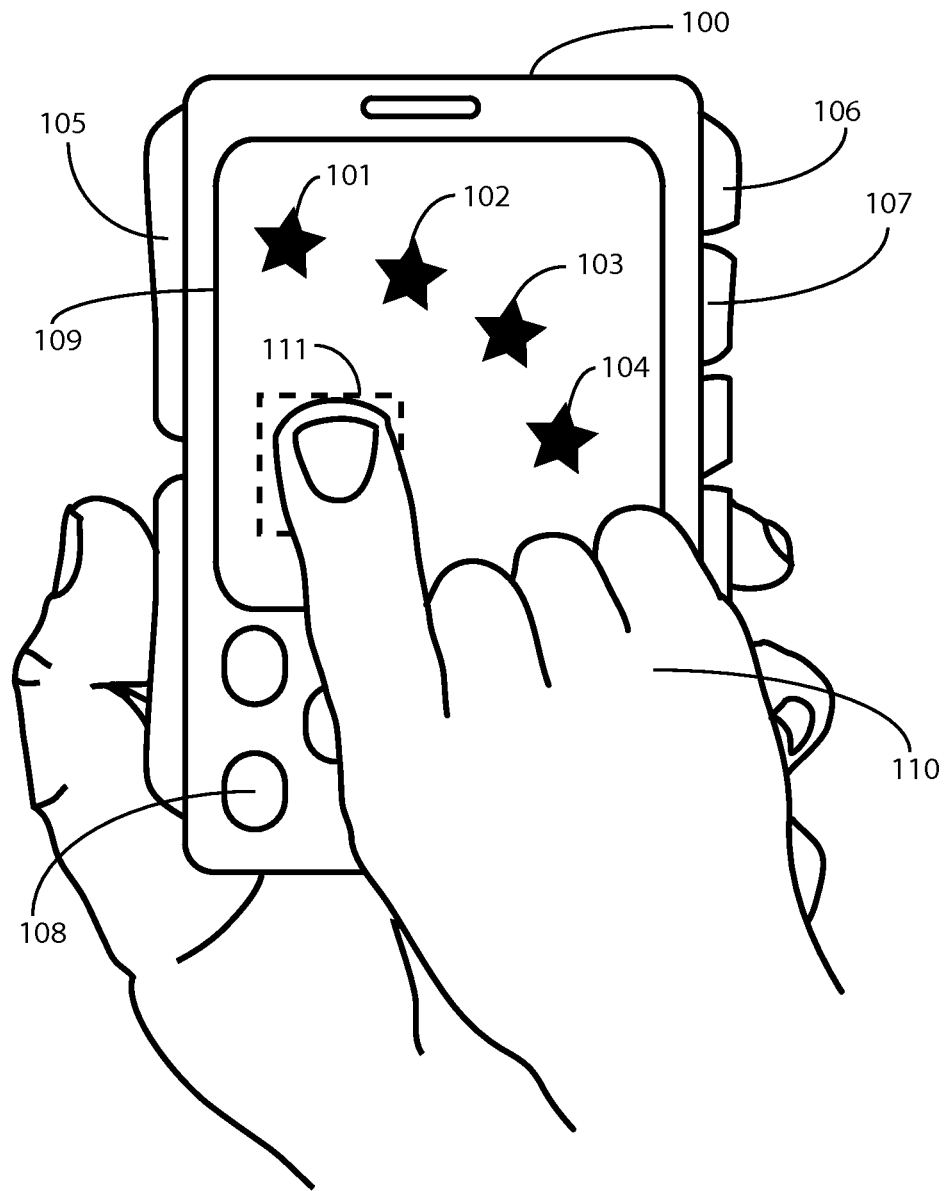
FIG. 1 illustrates one embodiment of an electronic device configured to replicate hard key functions with soft keys presented on a display of the electronic device in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to replicate physical key functionality with dynamic user actuation targets presented on a display in an electronic device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of presenting user actuation targets on a display, with those user actuation targets having functions corresponding to physical keys on the electronic device, as described herein. The non-processor circuits may include, but are not limited to, a radio receiver, a radio transmitter, signal drivers, clock circuits, power source circuits, and user input devices. As such, these functions may be interpreted as steps of a method to perform hard key replication. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a method and system for presenting user actuation targets as soft keys on a display in an electronic device. In one embodiment, the user actuation targets correspond in function to physical keys disposed along the electronic device. In one embodiment, the soft keys are presented upon a user contacting the display with, for example, a finger or stylus, for at least a predetermined amount of time. When this occurs, user actuation targets having functionality corresponding to one or more physical keys of the device are presented on the display. The user actuation targets can be presented near to the user contact location for easy access. Accordingly, the user can touch one of these user actuation targets to execute a particular function that normally would be performed with the actuation of a "hard" key, yet without having to locate and actuate a specific physical key.

Illustrating by way of example, one particular electronic device may be configured as a music player. A touch-sensitive display maybe disposed along a first major face of the device, e.g. the front of the device, while one or more physical keys will be disposed on the device as well. For instance, physical volume keys may be disposed along another face of the device, such as the side of the device.

In prior art solutions, to operate the volume controls, the user would need to move their hand away from the touch-sensitive display, around the device, and then physically access the volume controls on the side. This movement can be time consuming and cumbersome.

In one embodiment of the present invention, instead of moving the hand, the user simply touches the touch-sensitive display for at least a predetermined time, such as one to two seconds in an exemplary embodiment, and user actuation targets corresponding to the volume keys (or other hard keys) appear as soft keys on the display. Such an embodiment offers advantages over prior art solutions in at least two ways: first, the user may actuate the volume controls simply by accessing the soft keys, which eliminates the need to physically move the hand about the device. Second, as the soft keys only appear for a short period of time in one embodiment, when they are not present the entirety of the display is available to display other information. Said differently, the limited presentation time associated with the soft keys having hard key functionality frees display space to be used to present other information when the soft keys are not present.

In addition to presenting soft keys having hard key functions, other embodiments of the invention allow variation in the modes and methods of presentation of the soft keys. For example, in one embodiment a sensor is capable of determining not only how long the user is in contact with the display, but where the user contacts the display. Accordingly, the user actuation targets can be placed proximately with the user's finger or stylus for easy access.

In another embodiment, the user actuation targets can be configured to move closer to the user contact location as the user remains in contact with the display. In another embodiment, the user actuation targets can become magnified as the user remains in contact with the display. Other variations will be obvious to those of ordinary skill in the art having the benefit of this disclosure. Embodiments of the present invention not only make control of the electronic device easier and more efficient, but can make one-handed operation of the device simpler as well.

Turning now to FIG. 1, illustrated therein is one embodiment of an electronic device 100 configured to present one or more user actuation targets 101,102,103,104 having functions corresponding to one or more physical keys 105,106,107,108 in accordance with embodiments of the invention. The illustrative electronic device 100 shown in FIG. 1, which will be used herein for discussion purposes, is that of a multi-mode mobile telephone that includes a touch-sensitive display 109 for presenting information to a user 110. Electronic devices in accordance with embodiments of the invention can take many forms, such as mobile telephones, gaming devices, paging devices, multimedia devices, personal digital assistants, multifunction devices, and so forth.

While a touch-sensitive display 109 is included in the electronic device 100 for presenting and receiving data, in one embodiment the electronic device 100 additionally includes one or more physical keys 105,106,107,108 as well. Physical keys 105,106,107,108 can be provided to offer the user an optional user interface in addition to that provided by the touch-sensitive display. Further, it is sometimes convenient to provide physical keys 105,106,107,108 that correspond to frequently used functions, such as navigation.

In one embodiment, the physical keys 105,106,107,108 have dedicated functions. Examples of the dedicated functions may include the following: a home key that returns the user to a main portal from the various operational portals; a menu key that provides the user with a static or dynamic list of control options from a given operational portal of the device; volume keys for controlling speaker or headset volume; a back key configured to take the user to previous screens; an information or help key to assist the user; an edit key to allow the user to alter data; an addition key to permit the user to add new information; a set-up key; and so forth. Other dedicated functions will be obvious to those of ordinary skill in the art having the benefit of this disclosure.

Alternatively, one, some, or all of the physical keys 105, 106,107,108 can be "variable function" or configurable keys where the function of the key changes with the operational mode of the device. Illustrating by way of example, physical keys 106 and 107 may be configured as volume control keys when the electronic device 100 is in a music player mode. When the electronic device 100 is in an image viewing mode, physical keys 106 and 107 may be configured as image control keys, with physical key 106 taking the user to a previous image and physical key 107 taking the user to a next image.

The physical keys 105,106,107,108 can be a limited number of keys, such as three, four, or five dedicated or variable function keys. In such a configuration, the user 110 will transact and enter the majority of data through the touch-sensitive display 109. Alternatively, the physical keys 105, 106,107,108 may include a larger number of keys, and may even include a QWERTY keyboard. Further, keyboards can be configured to slide, rotate, or flip on housings in relation to the touch-sensitive display 109. The number of physical keys 105,106,107,108 shown in FIG. 1 is intended for discussion purposes only, as it is but one example of the number of keys that can be provided. It will be clear to those of ordinary skill in the art having the benefit of this disclosure that any number or configuration of physical keys 105,106,107,108 can be replicated with soft keys or user actuation targets 101,102, 103,104 in accordance with embodiments of the invention.

Operation of one embodiment of the invention can occur as follows: A user 110 touches the display 109 at a particular location 111. A processor, with the assistance of a sensor that is operable with the display 109, determines a duration of user contact with the display 109. Where this duration exceeds at least a predetermined threshold, such as 0.5, 1, 1.5, or 2 seconds for example, the processor presents one or more user actuation targets 101,102,103,104 on the display 109. In one embodiment, these user actuation targets 101,102,103,104 have functions that correspond to the functions of the physical keys 105,106,107,108 of the electronic device 100. The user 110 may thus execute the functions of the physical keys 105,106,107,108 by touching the user actuation targets 101, 102,103,104 instead of having to actuate the corresponding physical key.

It will be obvious to those of ordinary skill in the art having the benefit of this disclosure that embodiments of the invention can be configured in a variety of ways. For example, where a predetermined number of physical keys 105,106,107, 108—four in the illustrative embodiment of FIG. 1—are disposed along the electronic device 100, the same number of user actuation targets 101,102,103,104, having the same functions corresponding on a one-to-one basis, may be presented on the display 109. Alternatively, fewer user actuation targets can be presented. The choice is left to the designer and application. By way of example, if the electronic device 100 is configured in a music player mode, with the physical keys 105,106,107,108 comprising a play key, stop key, volume up key and volume down key, one designer may present four user actuation targets 101,102,103,104 on the display 109. Another designer may present, for example, only two user actuation targets corresponding to the volume up physical key and the volume down physical key to reduce visual clutter on the display 109.

Figure 2:
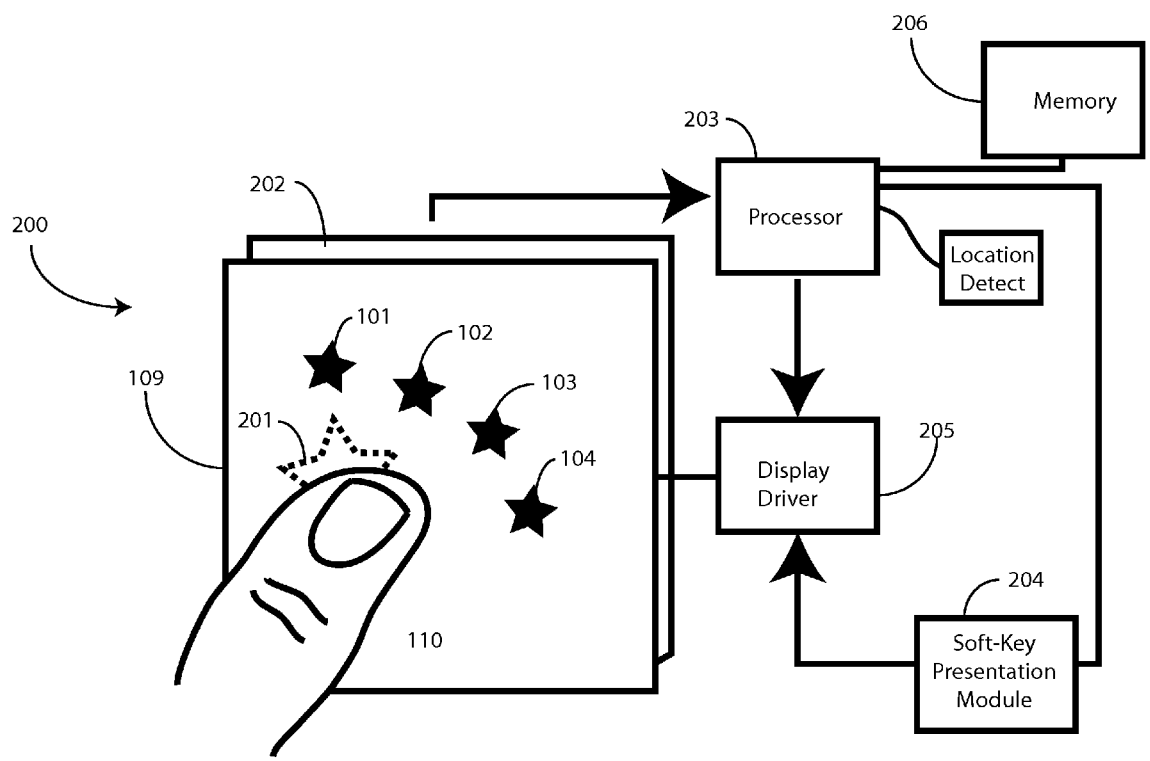
FIG. 2 illustrates a block diagram schematic of one embodiment of an electronic device configured to replicate hard key functions with soft keys presented on a display in accordance with embodiments of the invention.

Turning now to FIG. 2, illustrated therein is a schematic block diagram of one embodiment of an electronic device 200 in accordance with embodiments of the invention. In FIG. 2, touch-sensitive display 109 is configured to receive touch input 201 from a user. For instance, in normal operation the user may touch a user actuation target or soft key to request a menu or to select a particular option. In addition to receiving touch input, the touch-sensitive display 109 is configured to present information to a user as well, including menus, information related to the operational mode of the device, and other user actuation targets.

A sensor 202, operable with the touch-sensitive display 109, can detect a user's touch in any of a variety of ways. For example, in one embodiment the sensor 202 is configured as a plurality of infrared detectors disposed about the touch-sensitive display 109 to determine—by triangulation of reflected signals—where the user is touching the touch-sensitive display 109. In another embodiment, the sensor 202 can be configured as a capacitive sensor to determine where the user is touching the touch-sensitive display 109. For example, commonly assigned U.S. patent application Ser. No. 11/679, 228, entitled "Adaptable User Interface and Mechanism for a Portable Electronic Device," filed Feb. 27, 2007, which is incorporated herein by reference, describes a touch sensitive display employing a capacitive sensor. It will be obvious to those of ordinary skill in the art having the benefit of this disclosure that other touch-sensitive displays can be used as well.

A processor 203 is operable with touch-sensitive display 109 and the sensor 202. The processor 203, which may be a microprocessor, programmable logic, application specific integrated circuit device, or other similar device, is capable of executing program instructions—such as those shown in FIGS. 3-6—which may be stored either in the processor 203 or in a memory 206 or other computer readable medium coupled to the processor 203.

In one embodiment, the processor 203 is configured to be operable with a soft-key presentation module 204. The soft-key presentation module 204 can be configured as executable code, or alternatively may be configured as hardware, such as in programmable logic. The processor 203 and soft-key presentation module 204 are also operable with a display driver 205 to present information on the touch-sensitive display 109.

The soft-key presentation module is configured to, in one embodiment, replicate at least some of the physical keys (105,106,107,108) as soft keys by presenting user actuation targets 101,102,103,104 corresponding in function to the physical keys (105,106,107,108) on the touch-sensitive display 109 with the display driver 205 upon the sensor 202 determining that the user 110 has been in contact with the touch-sensitive display 109 for a time exceeding a duration threshold. For example, the soft-key presentation module 204 can be configured to present all or some of the user actuation targets 101,102,103,104 on the touch-sensitive display 109 via the display driver 205 when the user 110 has touched the touch-sensitive display for, say, 0.75 seconds.

In another embodiment, in addition to being configured to determine user contact and the duration of user contact, the processor 203 and sensor 202 can be configured to determine the location of user contact as well. For example, the sensor 202 can provide electrical signals to the processor 203 such that triangulation or other algorithms can be employed to determine the user contact location. Triangulation, used to determine an object's location by reflecting transmitted waves off the object, is well known in the art. Essentially, in triangulation, the infrared transceivers are able to determine the location of a user's finger, stylus, or other object by measuring angles to that object from known points across the display along a fixed baseline. The user's finger, stylus, or other object can then be used as the third point of a triangle with the other vertices known. Other methods can be used as well. Where the sensor 202 is a capacitive sensor, for example, the processor 203 can determine location directly from signals delivered by the sensor 202.

The determination of user contact location in addition to duration can be advantageous, in that the soft key presentation module 204 can be configured to present the user actuation targets 101,102,103,104 proximately with the location 201 of user contact. For example, in one embodiment, the soft-key presentation module 204 can be configured to present the user actuation targets 101,102,103,104 within a predetermined distance of the location 201 of user contact. As an example, in a touch-sensitive display measuring two inches by two inches, the soft key presentation module 204 may be configured to present each user actuation target 101,102,103,104 within three-quarters of an inch of the location 201 of user contact.

In addition to being configured to present user actuation targets 101,102,103,104 near the location 201 of user contact, in another embodiment the soft-key presentation module 204 can be configured to present the user actuation targets 101, 102,103,104 about the location 201 of user contact in a variety of ways. For example, if a particular number of physical keys (105,106,107,108) is sufficient large that presentation of the corresponding user actuation targets 101,102,103,104 on a particular display is cumbersome, the soft-key presentation module 204 can be configured to present only some of the user actuation targets 101,102,103,104, or alternatively may be configured to present user actuation targets that are more commonly used on the display. For instance, in one embodiment, the soft-key presentation module 204 can be configured to present user actuation targets 101,102,103,104 that have been more recently selected closer to the location 201 of user contact than are other options.

In another embodiment, the soft-key presentation module 204 can be configured to present the user actuation targets 101,102,103,104 about the location 201 of user contact in a number of advantageous geometric configurations. For instance, in one embodiment the soft-key presentation module 204 can be configured to present the user actuation targets 101,102,103,104 about the location 201 of user contact in a curved configuration. Such a configuration can make it possible to present more options to the user within the confines of the display's surface area. Other configurations, including partially-oval, semicircular, spiral, flower-petal, circular, and the like may also be used.

Once the user actuation targets 101,102,103,104 have been presented on the touch-sensitive display 109, the soft-key presentation module 204 can be configured to retain their presentation on the touch-sensitive display 109 for at least a predetermined duration after user contact with the touch-sensitive display 109 ends. This retention of presentation allows the user 110 to lift the finger or stylus from the location 201 of user contact and then actuate a particular user actuation target 101,102,103,104 by then touching the touch-sensitive display 109 above the desired user actuation target 101,102, 103,104. When the user touches the selected user actuation target, the processor 203 can be configured to execute a function corresponding to that user actuation target. Where the user actuation targets 101,102,103,104 replicate functions associated with the physical keys (105,106,107,108), the processor 203 executes a function corresponding to a physical key upon the sensor 202 detecting the additional user contact with the corresponding user actuation target.

Figure 3:
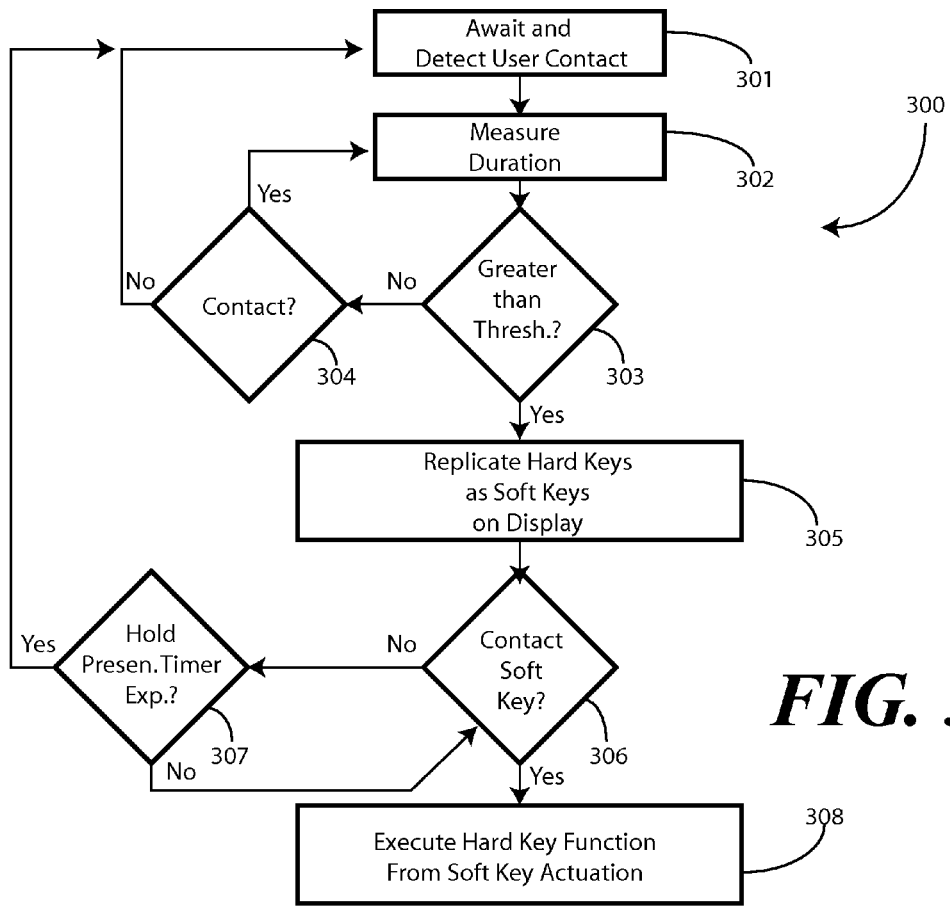
FIG. 3 illustrates one embodiment of a method of replicating hard key functions with soft keys presented on a display of an electronic device in accordance with embodiments of the invention.

Turning now to FIG. 3, illustrated therein is one method 300 for providing user actuation targets on a display of an electronic device having one or more physical keys in accordance with embodiments of the invention. The method of FIG. 3 can be configured as instructions stored in a computer readable medium, such as the memory (206) of FIG. 2. The instructions disposed in the computer readable medium can then be used to cause one or more processors to execute the steps of the method 300, which include determining the duration of user contact with a display and, where the duration exceeds a threshold, presenting one or more user actuation targets on the display. As described above, the user actuation targets can have functions equivalent to a plurality of physical keys disposed on one or more faces of an electronic device.

At step 301, a sensor in a touch-sensitive display or user interface detects contact by a user with the touch-sensitive display or user interface. The contact can be in the form of a finger, stylus, or other object coming into contact with the touch-sensitive display or user interface.

At step 302, one or more processors that are operable with the sensor can be configured to determine the duration within which the user maintains contact with the touch-sensitive display or user interface. For example, in one embodiment the one or more processors may initiate a timer upon detecting user contact with the touch-sensitive display or user interface that runs as long as contact is maintained. At decision 303, the one or more processors compares the duration measured at step 302 to determine whether the duration has exceeded a predetermined threshold. The threshold can be set to any number of values by a designer depending upon a particular need or application. In one embodiment, the duration will be sufficiently long that "nuisance presentation" of new user actuation targets is avoided, yet not so long as to require unduly lengthy user contact with the touch-sensitive display or user interface. Examples of suitable times for the predetermined duration threshold include times of between 0.5 seconds and two seconds.

Where the duration does not exceed the threshold, the method 300 determines whether contact is maintained at decision 304. If contact is not maintained, the method 300 can return to step 301. Where contact is maintained, but the duration is less than the predetermined threshold, the method 300 can continue to measure the duration at step 302.

Where the duration of user contact exceeds the predetermined threshold, the one or more processors can be configured to present at least one user actuation target on the display at step 305. In one embodiment, the at least one user actuation target is assigned a function that is substantially similar or equivalent to a function of one or more physical keys of the device. For example, where a physical key is configured as a "home" key that returns the device to a main screen from a particular operational mode, one of the user actuation targets presented on the display at step 305 can be a "home" soft key. Where the number of physical keys is sufficiently small, all of the physical keys can be represented as soft keys by user actuation targets presented on the display with functional replication occurring on a one-to-one basis. Where there are too many physical keys, a subset can be replicated as soft keys on the display. The designer can present, for example, higher priority physical keys on the display while omitting others. Alternatively, the user actuation targets can be presented as tiered menus, with the actuation of one user actuation target revealing others, and so forth.

Once the user actuation targets are presented on the display at step 305, this presentation can be continued for at least a predetermined time, thereby giving the user an opportunity to move a finger or stylus to a desired user actuation target. For example, the user actuation targets may remain on the display for two to three seconds upon cessation of user contact with the display. User actuation of a soft key is detected at decision 306.

Where the user has not actuated a soft key, the method 300 determines whether the presentation retention time has expired at decision 307. Where the user actuates a particular soft key as detected at decision 306, the one or more processors execute the function of a corresponding physical key at step 308.

In one embodiment, the method not only detects contact by the user at step 301, but, as described above, determines a location of user contact on the display at step 301 as well. Where location is used as input data, the method 300 can be configured to present the user actuation targets within a specific proximity of the location at step 305.

Figure 4:
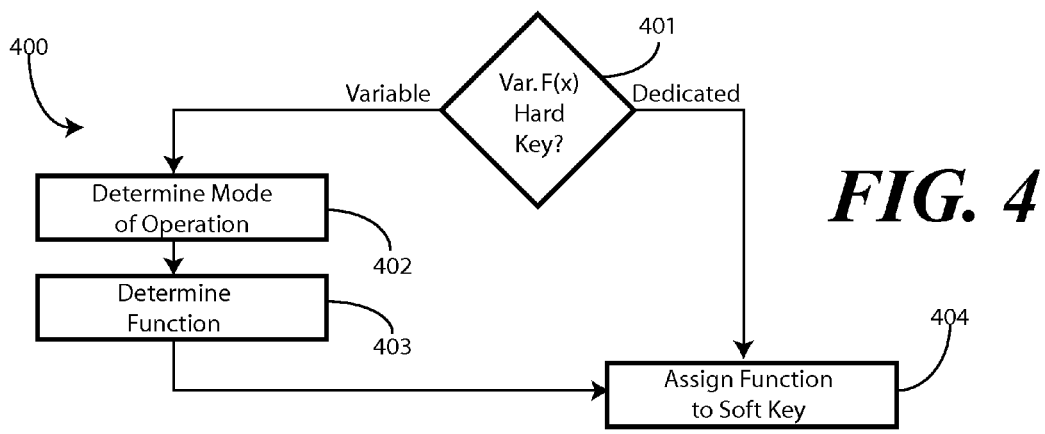
FIG. 4 illustrates one embodiment of a method of actuating a soft key having hard key functionality in accordance with embodiments of the invention.

As noted above, the physical keys of the electronic device with which the method 300 is being used can be either dedicated keys or variable function keys. Where the physical keys are variable function keys, their function may change with the operational mode of the device. Turning now to FIG. 4, illustrated therein are some steps that may be included with the method (300) of FIG. 3 where the physical keys comprise variable function keys.

Specifically, at decision 401, the method 400 determines whether one or more of the physical keys are variable function keys. Where they are variable function keys, such as keys whose function changes with the operational mode of the device, the method 400 can determine the particular operating mode of the device at step 403. The method 400 can then determine the function assigned to a particular physical key in a particular operating mode at step 404. This function can then be assigned to a corresponding soft key at step 404. Where the physical keys are variable function keys, the soft keys presented on the display will effectively be variable function keys as well, as the function will accordingly change with the operating mode of the device. Replicating physical keys with soft keys in accordance with embodiments of the invention offers an additional advantage in this regard in that the different functions of the soft keys may be identified with different graphical configurations. For example, a "home" key can be presented in the shape of a house, while a "back" key can be presented in the shape of an arrow.

Figure 5:
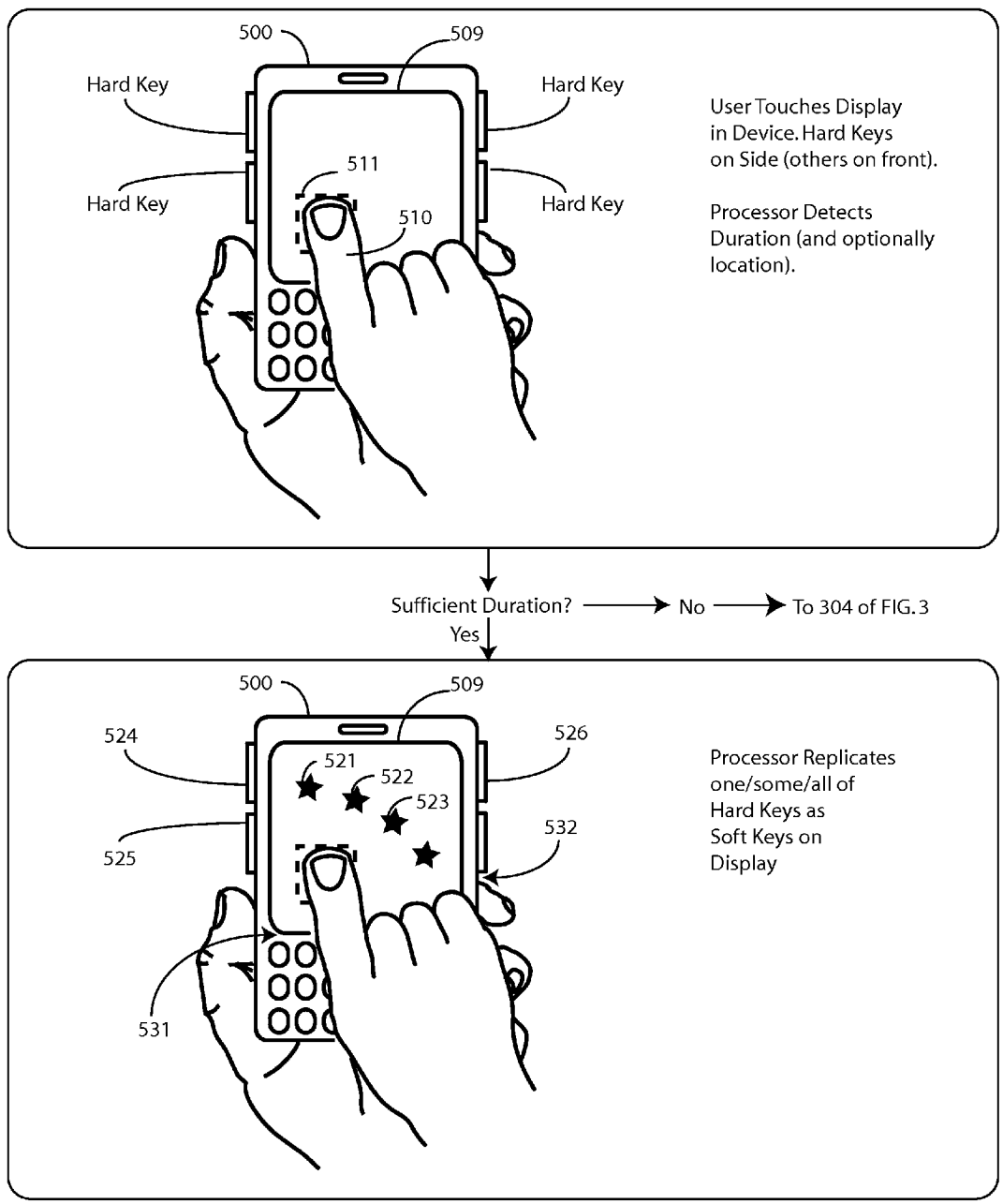
FIGS. 5 and 6 illustrate graphically a method of replicating hard key functions with soft keys presented on a display of an electronic device, and a method of actuating a soft key having hard key functionality in accordance with embodiments of the invention.
Figure 6:
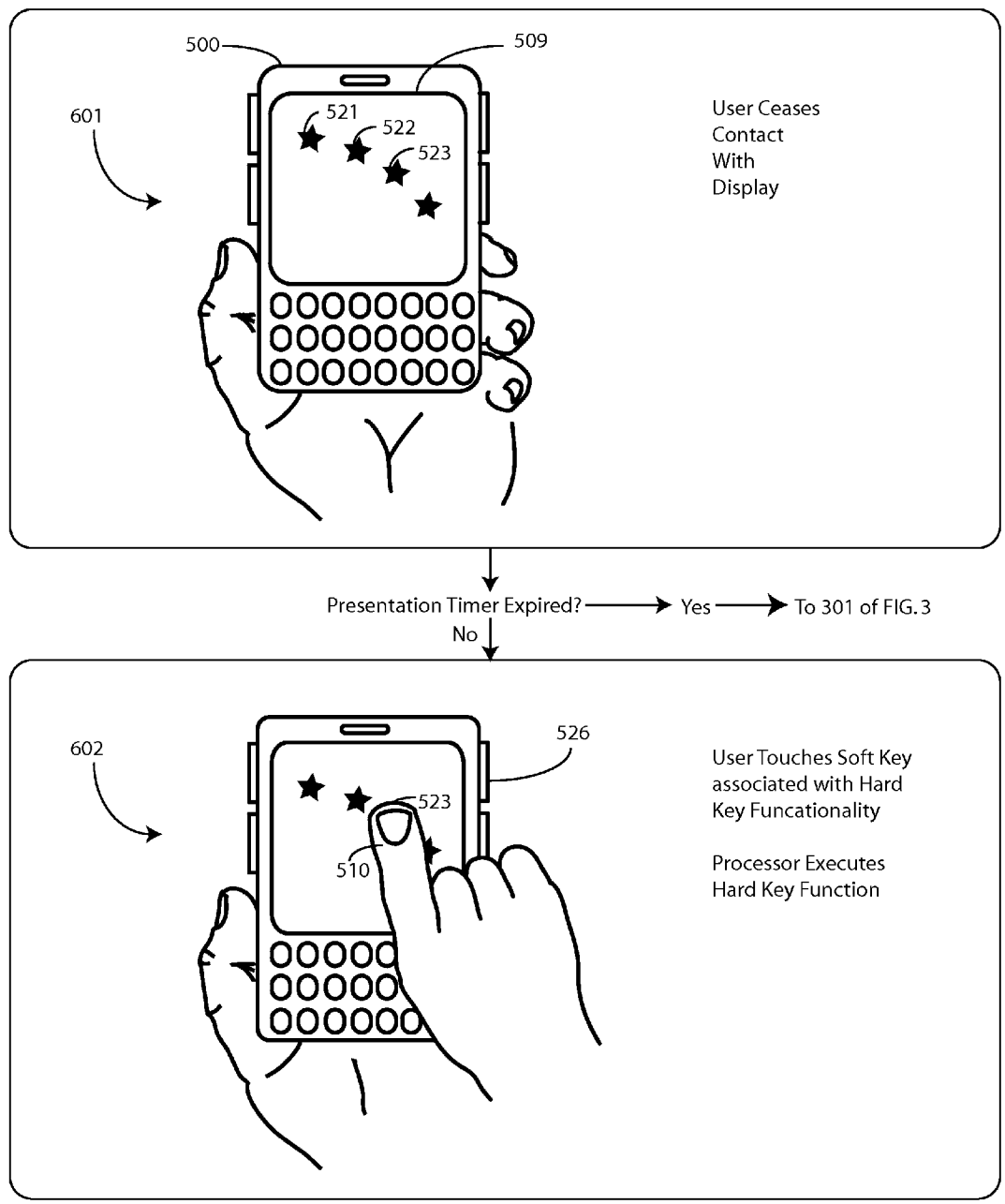

Turning now to FIGS. 5 and 6, illustrated therein is a graphical illustration of one embodiment of the invention functioning in practice. Beginning with FIG. 5, a user 510 touches the display 509 of an electronic device 500 at a particular location 511. A processor within the electronic device 500 then detects the user contact and determines a duration corresponding to the user contact. The processor may optionally determine the location 501 of user contact as well.

Where the user contact exceeds a threshold in duration, the processor presents one or more soft keys as user actuation targets 521,522,523 on the display 509. In one embodiment, these user actuation targets 521,522,523 provide the functions assigned to one or more physical keys 524,525,526 disposed along the electronic device 500. In one embodiment, the display 509 may be disposed on a first major face 531 of the electronic device 500, while the physical keys are disposed on another face 532 of the device. The user can touch one of the user actuation targets 521,522,523 to execute a function that would normally require actuation of one of the physical keys 524,525,526.

Figure 9:
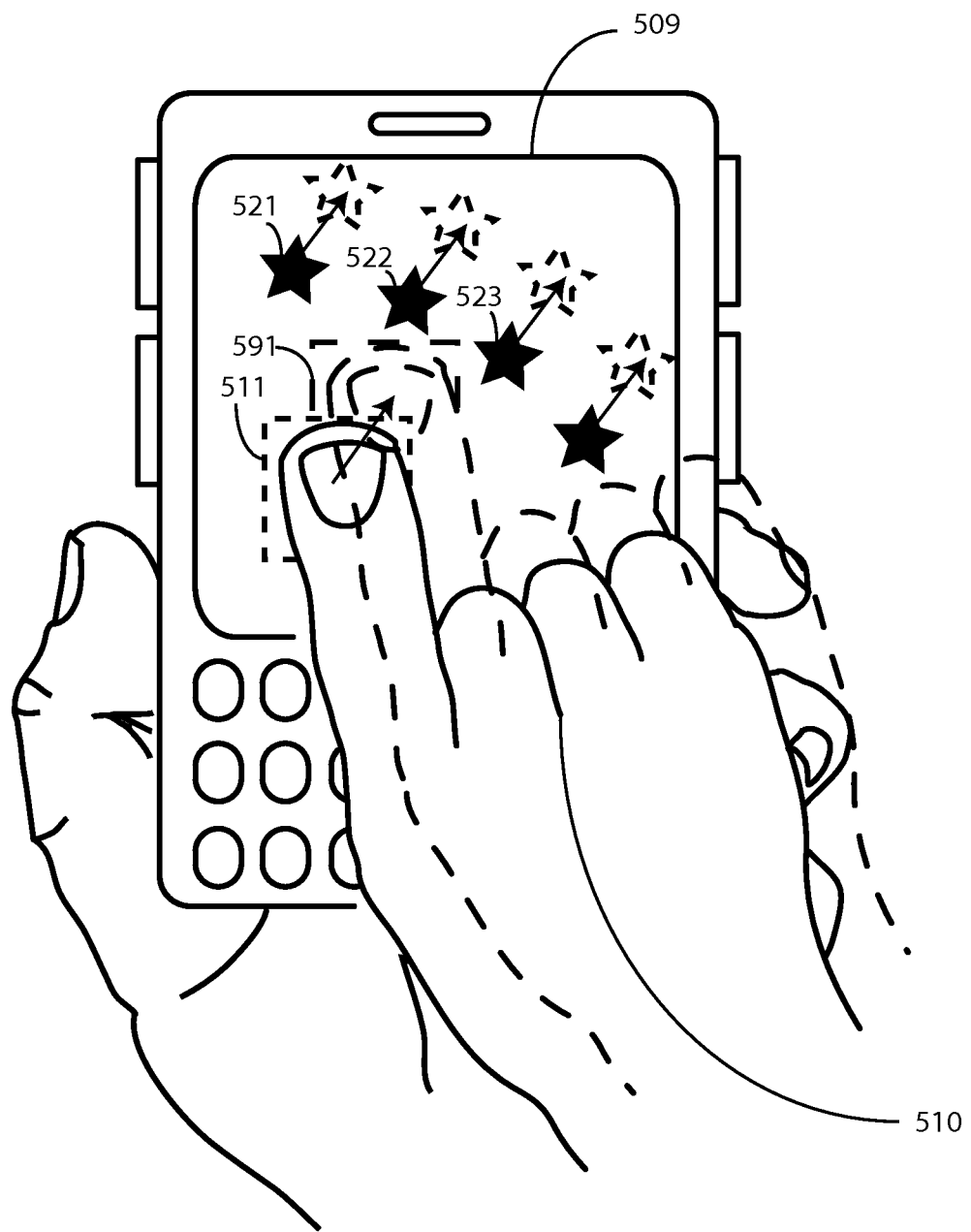
FIG. 9 illustrates an embodiment of an electronic device configured to replicate hard key functions with soft keys where a user can move the soft keys by moving an object, such as a finger or stylus, that is in contact with the display in accordance with embodiments of the invention.

In one embodiment, so long as the user 510 is touching the display 509, the user actuation targets 521,522,523 remain visible on the display. Some embodiments of the invention can be configured to facilitate manipulation of the user actuation targets 521,522,523 as well. For example, turning briefly to FIG. 9, illustrated therein is one embodiment where the user 510 may cause the user actuation targets 521,522,523 to move.

As noted above, when the user 510 touches the initial location 511 for at least a predetermined duration, the user actuation targets 521,522,523 appear. In this embodiment, if the user 510 maintains contact with the display 509 and slides the finger thereacross, the user actuation targets 521,522,523 move accordingly. For instance, if the user 510 moves the finger to a new location 591, the user actuation targets 521, 522,523 may move by a corresponding amount. Where a user's motion would cause the user actuation targets 521,522, 523 to move off-screen, the soft key presentation module can be configured to gradually move the user actuation targets 521,522,523 relative to the user's finger to keep them located visibly on the display 509.

Turning now to FIG. 6, the actuation of the soft keys is shown. As shown at image 601, the user can actuate a soft key by first releasing contact with the display 509. In one embodiment, the processor within the electronic device 500 is configured to continue presentation of the user actuation targets 521,522,523 for a predetermined time after cessation of user contact to allow the user to select one of the presented targets. As shown at image 602, the user can then touch one of the user actuation targets 523 to execute a function of one of the physical keys, e.g., physical key 526.

Figure 7:
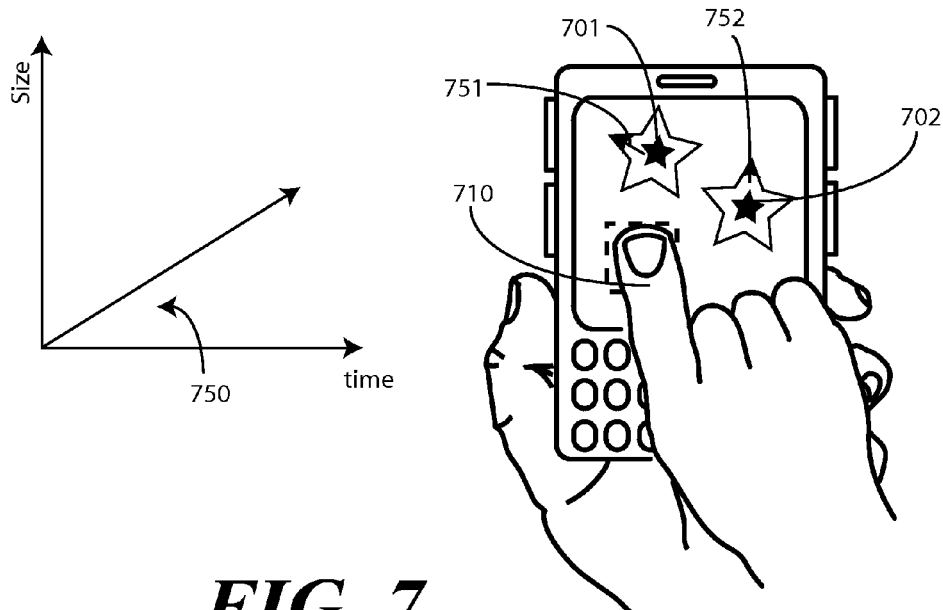
FIGS. 7 and 8 illustrate alternate embodiments of replicating hard key functions with soft keys presented on a display of an electronic device in accordance with embodiments of the invention.
Figure 8:
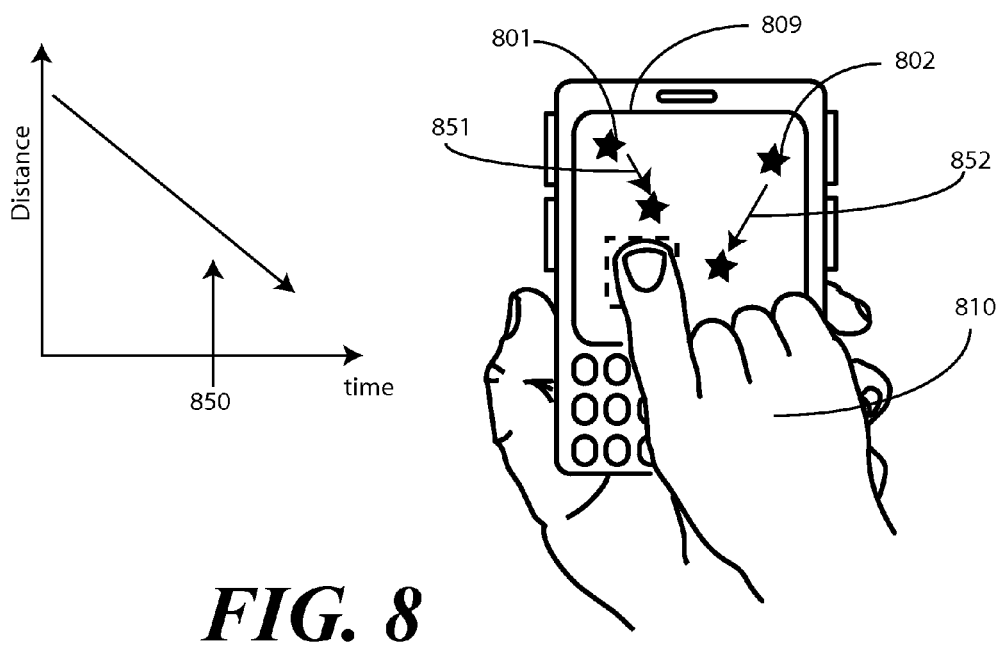

Turning now to FIGS. 7 and 8, illustrated therein are a few of the many presentation options suitable for user actuation targets presented in accordance with embodiments of the invention. While the soft keys can be presented as static objects, their presentation can also be varied. For example, FIG. 7 illustrates an embodiment where the user actuation targets get larger the longer the user remains in contact with the display. FIG. 8 illustrates an embodiment where the user actuation targets move closer to the user's location of contact as the user remains in contact with the display. Other variations will be obvious to those of ordinary skill in the art having the benefit of this disclosure as well.

In FIG. 7, a user 710 first makes contact with a display 709 or user interface at a particular location 711. Once the user 710 has been in contact with the display 709 for a predetermined amount of time, a processor presents user actuation targets 701,702 on the display 709. These user actuation targets 701,702 can correspond in function to one or more physical keys of the device.

In this exemplary embodiment, if the user 710 maintains contact with the display 709 sufficiently beyond the predetermined amount of time, the processor can be configured to gradually magnify the user actuation targets 701,702 as illustrated by graph 750 and expansion lines 751,752. In such a manner, the user 710 can cause the user actuation targets to get bigger with additional contact time.

FIG. 8 illustrates an alternate example of varying presentation of user actuation targets in accordance with embodiments of the invention, and provides one illustration of the flexibility with which embodiments of the invention may be implemented. In FIG. 8, a user 810 similarly first makes contact with a display 809 or user interface at a particular location 811. As with FIG. 7, once the user 810 has been in contact with the display 809 for a predetermined amount of time, a processor presents user actuation targets 801,802 on the display 809. As with previous embodiments, these user actuation targets 801,802 can correspond in function to one or more physical keys of the device.

In this exemplary embodiment, if the user 810 maintains contact with the display 809 sufficiently beyond the predetermined amount of time, the processor can be configured to gradually move the user actuation targets 801,802 closer to the location 811 of user contact, as illustrated by graph 850 and expansion lines 851,852. In such a manner, the user 810 can cause the user actuation targets to move closer with additional contact time.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for providing user actuation targets on a display of an electronic device having one or more physical keys, comprising:
  determining, with a contact sensor and one or more processors, a duration of user contact with the display; and
  where the duration of user contact exceeds a predetermined threshold, presenting, with the one or more processors, at least one user actuation target on the display, the at least one user actuation target having a function corresponding to at least one of the one or more physical keys.

2. The method of claim 1, wherein the at least one of the one or more physical keys comprises a variable function key, further comprising:
  determining a physical key function performed by actuation of the at least one of the one or more physical keys; and associating the physical key function with a corresponding user actuation target;
wherein the presenting comprises presenting the corresponding user actuation target.

3. The method of claim 1, further comprising magnifying the at least one user actuation target as the duration of user contact increases.

4. The method of claim 1, further comprising:
determining a location of user contact on the display; and
moving the at least one user actuation target closer to the location of user contact as the duration of user contact increases.

5. The method of claim 1, further comprising:
determining a location of user contact on the display;
wherein the presenting comprises presenting the at least one user actuation target proximately with the location of user contact.

6. The method of claim 5, wherein the presenting comprises presenting the at least one user actuation target within a predetermined distance from the location of user contact.

7. The method of claim 5, wherein the presenting comprises moving the at least one user actuation target as the user contact moves along the display.

8. The method of claim 1, wherein the one or more physical keys comprise a plurality of physical keys, further wherein the at least one user actuation target comprises a plurality of user actuation targets, wherein the plurality of user actuation targets are presented on the display with a one to one functional correspondence with the plurality of physical keys.

9. The method of claim 1, further comprising:
continuing presentation of the at least one user actuation target on the display for at least a predetermined period upon cessation of user contact with the display;
detecting user contact with a user actuation target; and
executing the function of a physical key functionally corresponding to the user actuation target.

10. A non-transitory computer readable medium in an electronic device comprising a processor, a display, and one or more physical keys, the non-transitory computer readable medium comprising instructions for a method, when executed by the processor, to present one or more user actuation targets on the display, the instructions comprising:
determining a duration of user contact with the display; and
where the duration of user contact exceeds a threshold, presenting user actuation targets on the display having functionality corresponding to that of the one or more physical keys.

11. The computer readable medium of claim 10, wherein the one or more user actuation targets have functions equivalent to a plurality of physical keys of the electronic device.

12. The computer readable medium of claim 11, the instructions further comprising:
determining a location of user contact on the display;
wherein the presenting comprises presenting the one or more user actuation targets within a predetermined distance of the location of user contact.

13. An electronic device comprising:
one or more physical keys for executing operations within the electronic device;
a processor coupled to a memory;
a display operable with the processor;
a sensor configured to detect user contact with the display; and
a soft key presentation module, operable with the processor, and configured to replicate at least some of the one or more physical keys as soft keys by presenting user actuation targets corresponding to the one or more physical keys on the display upon the user contact exceeding a duration threshold.

14. The electronic device of claim 13, wherein the sensor is further configured to detect a location of user contact on the display, wherein the soft key presentation module is configured present the user actuation targets corresponding to the one or more physical keys proximately with the location of user contact.

15. The electronic device of claim 14, wherein the soft key presentation module is configured to present the user actuation targets corresponding to the one or more physical keys within a predetermined distance of the location of user contact.

16. The electronic device of claim 14, wherein the soft key presentation module is configured to present the user actuation targets around the location of user contact.

17. The electronic device of claim 14, wherein the soft key presentation module is configured to present the user actuation targets corresponding to the one or more physical keys for at least a predetermined duration after the user contact with the display ends, wherein the processor is configured to execute a function corresponding to a physical key upon the sensor detecting an additional user contact with a corresponding user actuation target.

18. The electronic device of claim 17, wherein the display is disposed along a first face of the electronic device, wherein at least some of the one or more physical keys corresponding to the user actuation targets are disposed along a face of the electronic device other than the first face.

19. The electronic device of claim 14, wherein the one or more physical keys comprise variable function keys, with functions of the variable function keys changing with an operational mode of the electronic device.

20. The electronic device of claim 14, wherein the electronic device comprises a mobile telephone.

* * * * *